United States Patent Office 2,937,098
Patented May 17, 1960

2,937,098
LIQUID POLISHING COMPOSITION DRIABLE TO A BRIGHT COATING

Henry C. Geen, Hinsdale, Ill., assignor to Simoniz Company, a corporation of Delaware No Drawing. Application September 18, 1958
Serial No. 761,697

12 Claims. (Cl. 106—10)

This invention relates to a polishing composition driable to a bright surface without requiring buffing.

This application is a continuation-in-part of my copending application, Serial No. 562,655, filed February 1, 1956, now abandoned, which itself was a continuation-in-part of my application, Serial No. 499,507, filed April 5, 1955, and now abandoned.

The polish composition of this invention is a water based polish in which the ingredients are dispersed in the water by means of a dispersing agent. The polish is of the well known dry bright type which needs only be applied to the surface to be polished, such as a floor, and then permitted to dry to form a bright protective surface. This type of polish is of course well known in the art and is widely used.

One of the problems with a polish of this type is to provide good coverage of the surface so that merely upon spreading the polish over the surface it will substantially uniformly cover the surface to produce a uniform polish film upon drying. In other words, the polishing composition must have good leveling characteristics.

One of the features of this invention is to provide an improved polishing composition driable to a bright surface without requiring buffing, comprising an aqueous vehicle, a non-volatile, water insoluble film former, a dispersing agent present in an amount sufficient to form a stable dispersion of the film former in the vehicle with the dispersion breaking down upon evaporation of the vehicle to form a thin layer of the film former on a surface, thereby depositing the film former in a smooth, bright layer on said surface, and about 0.0025–2% by weight of the composition of a perfluoroalkyl compound having the formula $(C_aX'_{2a+1})_fZ$, wherein $a$ is a small number of 6–12, $X'$ is a member of the class consisting of hydrogen and fluorine atoms with the groups $C_aX'_{2a+1}$ having at least 55% by weight of fluorine atoms, $f$ is a small whole number of 1 to 8, and Z is a hydrophilic group.

Other features and advantages of this invention will be apparent from the following description of the invention and embodiments thereof.

The polishing composition of this invention comprises a continuous phase aqueous base constituting at least about 50% by weight of the composition and up to about 50% solids dispersed and dissolved in the aqueous base. These solids include non-volatile film formers, emulsifiers which may be either anionic, cationic, or non-ionic to serve as emulsifying and dispersing agents for the dispersed solids, and from about 0.0025% or less to about 2% or more by weight of the composition of a perfluoroalkyl leveling agent.

In general, the fluorocarbon leveling compounds have the following structural formula: $(C_aX'_{2a+1})_fZ$, wherein $a$ is a small number of at least 6 and preferably 7–12, $X'$ is a member of the class consisting of hydrogen and fluorine atoms with the groups $C_aX'_{2a+1}$ having at least 55% by weight of fluorine atoms, $f$ is a small whole number of 1 to 8, and Z is a water solubilizing group of which typical groups are acid groups including sulfonic acid groups and their salts, substituted sulfuric acid groups and their salts and substituted phosphoric acid groups and their salts in which the substituents are preferably alkyl radicals of 1–5 carbon atoms and the like, the salts in all said salt groups preferably being either alkali metal, ammonium, alkaline earth metal or amine salts; quaternary ammonium salt groups; amine salt groups; polyhydroxy groups such as glycols, polyols and the like; polyoxyalkylene groups; substituted short chain amino acid groups and their salts as defined above; carboxy acid groups and their salts as defined above; hydroxy groups; aldehyde groups; amide groups and substituted amide groups in which the substituent is preferably alkyl of 1–5 carbon atoms, and other water-solubilizing groups all of which are well known to those skilled in the art.

Compounds that have been found particularly useful are at least partially water soluble and have one of the following structural formulas:

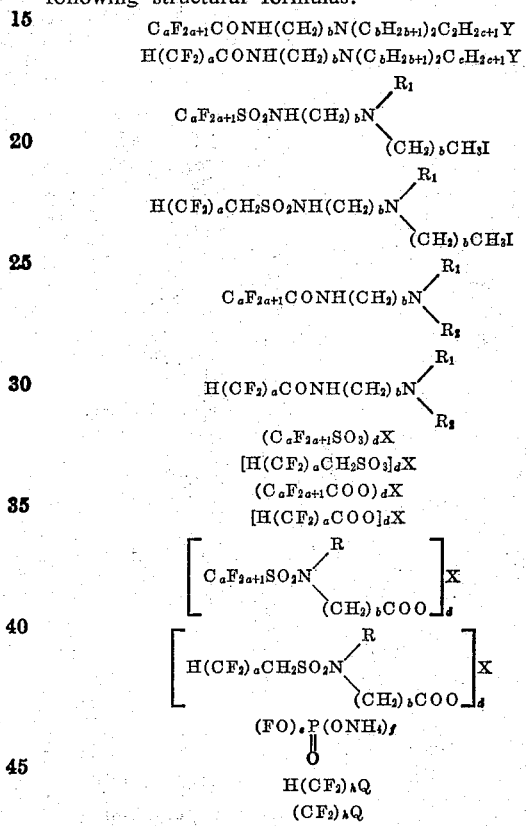

wherein $a$ is a whole number of 6–12, $b$ is a whole number not greater than 5, $c$ is a whole number not greater than 15, $d$ is a whole number not greater than 2 and having the same value as the valence of X, $e$ and $f$ are whole numbers totaling 3, X is a member of the class consisting of hydrogen, alkali metals, alkaline earth metals, amine groups, and ammonium, Y is a halogen, R is an alkyl group of not more than 5 carbon atoms, $R_1$ is a member of the class consisting of alkyl groups of not more than 5 carbon atoms and hydrogen, $R_2$ is a member of the class consisting of hydrogen, alkyl groups of not more than 5 carbon atoms, aryl groups, alkyl groups attached to a water-solubilizing salt-forming anion, heterocyclic aryl groups in which the nitrogen atom of said $$-N\diagdown_{R_2}^{R_1}$$

portion of the second formula set out above is an element in the ring, $h$ is a whole number of 6–12, Q is a member of the class consisting of TOH in which T is a divalent hydrocarbon radical and TOH is a monovalent radical of a nontertiary alcohol which contains a non-aromatic carbon atom bearing the alcoholic hydroxyl group and in which all of the non-aromatic carbon atoms are saturated, and at least partially water soluble oxidation products of TOH including aldehydes, acids and alkali metal, alkaline earth metal, amine and ammonium salts of said acids, and FO is a perfluorinated alcohol group containing 6 to 13 carbon atoms; and a Werner type coordination complex of trivalent chromium and perfluoroalkyl monocarboxylic acids containing from 7–13 carbon atoms per acid molecule in which the acids have the formula $C_gF_{2g+1}COOH$ wherein $g$ is a whole number of 6–12 and the ammoniated derivative of said complex.

Certain of the above types of compounds are disclosed and identified in U.S. Patents 2,559,628, 2,559,751, 2,567,011, 2,597,702, 2,693,458, 2,727,923, and 2,732,398.

In the above structural formulas, it is preferred that the solubilizing salt-forming anion which may form a part of $R_2$ be an acid group such as a halide, sulfate, sulfonate, nitrate, and the like. The alcohols of the above $H(CF_2)_hQ$ compound are preferably prepared according to Joyce Patent 2,559,628.

The Werner type complex included herein is a perfluorinated fatty acid chromium complex preferably employed dissolved in a water-soluble solvent, which in the preferred form is an aliphatic alcohol, especially isopropyl alcohol. The complex is formed according to the method set out in M. H. Olson Patent 2,693,458, issued November 2, 1954, and assigned to Minnesota Mining and Manufacturing Company of St. Paul, Minn. As is explained here, the complex is one of trivalent chromium and perfluoroalkyl monocarboxylic acids and contains two perfluoro acido groups per chromium atom. It is a water insoluble, tacky, viscous liquid in which the chromium is in a trivalent state but is soluble in alcohols, ketones, esters, formalin, and is sparingly soluble in diethylether. As mentioned in this patent, the ammoniated complexes may be used if desired. It is preferred that the complex be used in this invention in an alcohol, especially an isopropyl alcohol solution. It has been found particularly useful in this invention when used in the form identified by the manufacturer as "FC–804" in which a typical analysis is solids 30% and isopropyl alcohol 70% of which 5.4% of the solid is chromium. In this form it is soluble in water in all proportions.

The following are typical fluorocarbon compounds:

1. $C_7F_{15}CONHC_3H_6N(CH_3)_3I$
2. $C_7F_{15}CONHC_3H_6N(CH_3)_2$
3. $C_7F_{15}CONHC_3H_6N(CH_3)_2C_{10}H_{21}Br$
4. $C_7F_{15}CONHC_3H_6N(CH_3)_2C_2H_5I$
5. a mixture of the ammonium salts of mono- and di-(1,1,7-trihydroperfluoroheptyl) phosphate
6. A mixture of the ammonium salts of mono- and di-(1,1,11-trihydroperfluoroundecanoic) phosphate
7. A mixture of the ammonium salts of mono- and di-(1,1,9-trihydroperfluorononyl) phosphate
8. A mixture of compositions having the general formula $H(CF_2)_nCH_2OH$ where $n$ equals a whole number of 6–12
9. $C_7F_{15}COOH$
10. $C_7F_{15}COONH_4$ 11. 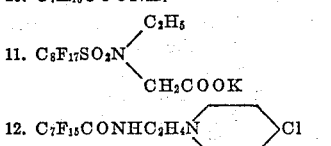

12. 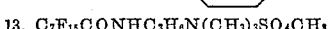

13. $C_7F_{15}CONHC_3H_6N(CH_3)_3SO_4CH_3$
14. $C_9F_{19}CONHC_3H_6N(CH_3)_3I$
15. $C_8F_{17}SO_3K$
16. Complex formed by reacting together in a 1:2 molar ratio chromium trioxide and perfluorooctanoic acid
17. $H(CF_2CF_2)_6COONH_4$
18. Ammonium dodecafluoroheptyl phosphate 19. 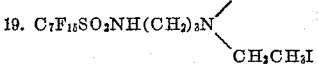

Although many of the above compounds are only very slightly soluble in water, they are still operable in aqueous surface coating compositions because only a very small amount is required. In general, the smallest amount of fluorocarbon compound suitable to produce the desired leveling characteristics is used so that an unnecessary excess may be avoided. Thus, tests have shown that the minimum amount of fluorocarbon compound necessary in certain instances is ordinarily preferably about 0.0025% or less by weight of the entire surface coating composition. The maximum amount ordinarily does not exceed 1% or 2%, although it may be more if desired.

Tests have shown that the fluorocarbon compounds have unusually unexpected characteristics in improving the leveling in aqueous based self polishing floor polishes. This permits the formation of more uniform films, particularly on those surfaces which are not usually well coated by dry-bright polishes. These compounds are all fluorinated compounds containing fluorine atoms attached directly to carbon atoms in the molecule.

The self polishing aqueous based polishes have been found to have improved leveling when they each contain one or a combination of the fluorocarbon compounds of this invention. Extensive tests have proven that the leveling is improved in these water based self polishing polishes generally without regard to the type of coating material or film former dispersed in the aqueous base. In general, these aqueous based self polishing polishes have five basic types of film formers. These are generally classified as follows:

(1) A relatively large amount of wax, over 50 parts by weight, and relatively low amount of resin, up to 50 parts by weight, in the dispersed film formers.

(2) A relatively large amount of resin, over 50 parts by weight, and relatively low amount of wax, up to 50 parts by weight, in the dispersed film formers.

(3) Synthetic polymer types of film formers.

(4) All resin film formers.

(5) All wax film formers.

In the above classes 1 and 2 the total parts in each are 100.

In all of these types of water based self polishing polishes wherein the film former is dispersed in the water, leveling was improved by the addition of the fluorocarbons of this invention. Representative formulas and their methods of formulation are given in the following examples. These examples are not restrictive, but are merely exemplary of the basic types of self polishing polish formulas to show that the improved leveling is achieved in water based self polishing polishes generally and that the improved results are not due to any specific formula. Thus the tests have indicated that whenever an aqueous base self polishing polish is usable on a surface such as a floor, its leveling characteristics are improved by the addition of a fluorocarbon compound of this invention.

*Example 1*

In this example of a floor polish prepared according to this invention:

A. An aqueous dispersion was prepared at room temperature containing 8000 parts by weight of an aqueous dispersion of a polystyrene having a solids content of approximately 36%, to which is added a homogeneous premix of 192 parts by weight of tributoxyethyl phosphate and 240 parts by weight of dibutyl phthalate, followed by about 2.7 parts by weight of fluorocarbon compound 1 in the above list. The phosphate and the phthalate compounds are plasticizers for the polystyrene. The resulting composition which contained about 39% solids was diluted with 2 volumes of soft water to produce a solids content of approximately 13%. The dispersion of a polystyrene has the trade name "Ubatol U–2001" and is made by UBS Chemical Corporation of Cambridge, Massachusetts. The dispersed polystyrene particles are of less than 0.03 micron average diameter and carry negative charges. The polystyrene in this compound has a molecular weight of about 150,000–200,000. Instead of the above mentioned plasticizers other plasticizers such as dibutoxyethyl phthalate may be used. The amount of the plasticizer is preferably kept as low as possible and this amount can be as low as 11% by weight of the solids content of the composition.

B. A second composition was then prepared by mixing 110 parts by weight of an oxidized polyethylene, 22 parts by weight of red oil which is essentially oleic acid and 22 parts by weight of morpholine, which are melted together and poured into 846 parts by weight of water at 120° F. with sufficient agitation to emulsify. The oxidized polyethylene is identified as "AC polyethylene 629" made by the Semet-Solvay Petrochemical Division of Allied Chemical & Dye Corporation, 40 Rector Street, New York City. The oxidized polyethylene of this product has an average molecular weight of about 2000, a saponification value and acid number of about 14–17, a melting point of about 205–208° F. and a viscosity of 40–50 Saybolt Furol seconds at 140° C. 30 cc. efflux.

C. A third composition was then prepared by dispersing 450 parts by weight of shellac in a solution consisting of 54 parts by weight of sodium tetraborate pentahydrate (5 mol borax) in 3696 parts by weight of water at about 120° F. The amount of 5 mol borax can be between 11–13% by weight of the shellac present.

D. The above three compositions A, B and C were then mixed together in the proportions of 60 parts by volume of composition A, 10 of B and 30 of C to form the final composition. In each instance herein where the amount of each ingredient is given as parts by weight these parts are all the same unit. In this example, each unit is one gram.

In preparing the composition of this example, the fluorocarbon compound is added initially to the plasticized polystyrene dispersion in an amount of about 0.01% by weight of the final composition. In this example, the compound is the one identified by the numeral 1 in the list hereinabove.

The above composition was found to have excellent leveling characteristics when merely poured on a surface such as a floor tile with the excess removed by holding the tile vertically. The tile was coated uniformly and the coating dried to a bright surface.

The fluorocarbon compound is additionally important as it permits a large reduction in the amount of shellac used while still producing a superior composition. Thus, prior compositions having satisfactory leveling and luster characteristics employed as much as 75% or more of shellac by weight of the solids present to produce desired characteristics in the coating composition. By using a fluorocarbon compound of the type described herein this amount of shellac was reduced to about 17% or less. No other compound has been discovered that is so successful with such a small amount of shellac.

In the above example, the film former that is dispersed in the aqueous carrier is the polymer polystyrene. In this formula is also included shellac dispersed by means of an alkali. In general, the polystyrene formulas similar to this example contain about 50–75% by weight of an aqueous dispersion of a polystyrene, about 10–20% by weight of an aqueous dispersion of an oxidized polyethylene, and about 15–30% by weight of an aqueous alkaline dispersion of shellac.

Example 2

Another surface coating composition capable of drying to a bright coating has the following composition:

| | Approximate parts by weight |
|---|---|
| Softened water | 7133 |
| Caustic soda | 9.5 |
| Borax, 5 mol. | 100 |
| Oxidized microcrystalline wax | 169 |
| Terpene-phenolic condensation resin | 103 |
| Red oil (oleic acid) | 44 |
| Shellac | 775 |
| | 8333.5 |

About 0.01% of fluorocarbon compound 1 by weight of the above composition was found to greatly improve the leveling characteristics of this polish.

Example 3

In a further example of a self polishing floor polish prepared according to this invention:

A. An alkali solution was prepared by mixing 121 grams of sodium hydroxide and 174 grams of borax containing 5 mols of water in the molecule into one-half gallon of soft water.

B. A shellac solution was prepared by heating 2 gallons of soft water to 97° F. and then mixing in 378 grams of 26° Bé. ammonia and 4.17 lbs. of bleached shellac. The solution was held until it became clear.

C. A wax emulsion was prepared by melting 5 lbs. of carnauba wax, 5 lbs. of oxidized microcrystalline wax, and 5 lbs. of microcrystalline wax together. 833 grams of mixed animal fatty acids were then added and the temperature maintained at 208° F. The alkali solution of A, above, was then mixed into the melted wax mixture slowly and the temperature held at about 205° F. After this, 7 gallons of soft water were added slowly until the wax mixture became the dispersed phase, after which the remainder of the water was added more rapidly. The completed dispersion was then cooled to 97° F. with continued agitation.

D. A concentrate was then prepared by mixing 7 gallons of the above wax emulsion C, 2.6 gallons of the above shellac solution B, 18.9 grams of Butrol as a disinfectant, and then soft water was added to bring the total volume up to 10 gallons.

E. The final polish formulation was then prepared by mixing 155 cc. of D above, 27.5 cc. of a 1% aqueous solution of fluorocarbon compound No. 19 in the above list and 92.5 cc. of softened water. This resulting polish formulation was found to give improved leveling over the same formulation, but with no fluorocarbon compound present.

Example 4

In this formula, 150 cc. of D of Example 3, 63.0 cc. of a 4.4% solution of compound 18 in the above list and 62.0 cc. of soft water were mixed together. Here, also, leveling was found to be improved by the presence of the fluoro compound.

Example 5

In this example, the self polishing polish includes dispersed wax and dissolved shellac in an aqueous carrier:

A. A wax emulsion containing about 20% by weight of solids was prepared by melting 600 grams of carnauba wax at a steam bath temperature of 210° F., after which 120 grams of oleic acid was added. When the melt was complete, 75 grams of morpholine was added and stirred into the melt. Then, 50 grams of boiling soft water was stirred in the melt until the color became dark brown. As this time then the remainder of 4000 grams of boiling soft water was added in 120 gram increments over a period of approximately 10 seconds. It is preferred that this wax emulsion be made in 500 gram increments proportioned in the same proportions as given above and then these increments combined after all increments are prepared.

B. A shellac solution containing 25% by weight solids was prepared by adding 925 grams of bleached shellac to 1800 grams of soft water with stirring. This agitation was continued until the shellac was completely wet. At this time, 180 grams of 26° Bé. aqueous ammonia was added and the entire mixture stirred for 40 minutes at a temperature of about 130° F. At the end of this time, enough cold soft water was added to bring the total weight of the shellac solution up to 3700 grams.

C. The final polish formulation of this example was then prepared by mixing 125 cc. of wax emulsion A, above, 75 cc. of a 0.4% solution of fluorocarbon compound No. 11 of the above list, 28.0 cc. of shellac solution B above and 52.0 cc. of soft water. The resulting water based self polishing polish was found to have improved leveling characteristics.

Example 6

A polish formulation similar to Example 5 above was prepared by mixing 125 cc. of wax emulsion A of Example 5, 63.0 cc. of a 4.4% aqueous solution of compound No. 18 of the above list, 28.0 cc. of shellac solution B of Example 5 and 64 cc. of soft water. Here again, improved leveling was observed.

Example 7

A. A wax emulsion containing about 21% solids was prepared from the following ingredients:

|  | Grams |
|---|---|
| Carnauba wax | 270.0 |
| Microcrystalline wax | 135.0 |
| Oleic acid | 49.5 |
| Caustic soda | 7.2 |
| Borax, 10 mols of water in a molecule | 13.5 |
| Soft water to | 2250.0 |

This wax emulsion was made in increments of 250 grams which were then combined. In making the increments, the oleic acid, carnauba and microcrystalline waxes were mixed and melted together at steam bath temperature of 210° F. with stirring. After melting was complete, the caustic soda and borax were added, dissolved in 15 grams of boiling water. The mixture was then stirred for a few minutes until a clear brown transparent viscous melt was obtained. Boiling water was then added in small portions of about 4 cc. with stirring between each addition until the wax melt became the discontinuous phase. As soon as this inversion point had been reached, the remaining water was added more rapidly.

B. The shellac solution used was the same as that set out in B of Example 5 above.

C. The complete formulation was then prepared by mixing 125 cc. of wax emulsion A of this example, 45 cc. of soft water, 75 cc. of a 0.4% aqueous solution of compound No. 11 of the above list and 30 cc. of shellac solution B above. This polish was found to have improved leveling characteristics.

Example 8

This example is similar to Example 7. The polish here was prepared by mixing 125 cc. of wax emulsion A of Example 7, 45 cc. of soft water, 75 cc. of a 0.4% aqueous solution of fluorocarbon compound No. 18 in the above list and 30 cc. of shellac solution B of Example 7.

The preceding examples are typical examples of formulas containing relatively large amount of wax and small amount of resin in the dispersed film former in the polish.

Example 9

A. A wax emulsion of about 21% by weight of solids was prepared by melting together 322 grams of 50% by weight Durez resin No. 219, which is an isomerized terpene phenolic resin, with 50% oxidized microcrystalline wax, 102 grams of oxidized microcrystalline wax, and 68.4 grams of oleic acid. 14.6 grams of caustic soda and 12.1 grams of borax containing 5 mols of water in the molecule were dissolved in 300 cc. of boiling soft water and this was added with stirring to the above melted wax composition. When this melt became a dark brown clear transparent mixture, the mass was poured into 1200 cc. of boiling water during rapid stirring. The resulting mixture was then brought up to a final weight of 2,470 grams by adding cold soft water.

B. A shellac dispersion containing 25% solids was prepared by prewetting 500 grams of bleached shellac in 1200 cc. of cold soft water and this mixture was heated to 90° F. with stirring. 58.4 grams of 5 mol borax was than added and heating and stirring was continued until the temperature reached 120° F. This temperature was maintained for about 40 minutes and then sufficient cold soft water was added to make the total weight about 2233 grams.

C. The polish formula of this example was then prepared by mixing 41 cc. of wax emulsion A, 96 cc. of shellac dispersion B, 69 cc. of a 0.4% aqueous solution of fluorocarbon compound No. 1 in the above list, and 69 cc. of softened water.

Example 10

A. A wax emulsion containing about 18% solids was prepared from the following ingredients:

|  | Grams |
|---|---|
| Candelilla wax | 225.0 |
| Oxidized microcrystalline wax | 39.0 |
| Oleic acid | 42.5 |
| Caustic soda | 9.0 |
| 5 mol borax | 16.0 |
| Soft water to | 1500.0 |

This emulsion was made in increments of 300 grams which were later combined. The candelilla wax and the oxidized microcrystalline wax were melted in the presence of the oleic acid at a temperature of about 210° F. When the waxes had been melted, the caustic soda and borax dissolved in about 20 cc. of boiling soft water were added to the wax melt. The mixture was then stirred until a clear brown transparent viscous melt was obtained. Boiling water was then added in small portions of about 4 cc. with agitation between each addition until the phases had inverted with the wax mixture being dispersed as the discontinuous phase. After this had achieved, water was added rapidly until the above final weight was reached.

B. A shellac dispersion was prepared as set out above in B of Example 9.

C. To produce the finished polish containing about 30% by weight of the wax emulsion and about 70% of the shellac dispersion and having a solids content of between 11–12%, 58.0 cc. of wax emulsion A, 96.0 cc. of shellac dispersion B, 69.0 cc. of a 0.4% aqueous solution of fluorocarbon compound No. 11 in the above list and 52.0 cc. of soft water were mixed. The resulting self polishing polish was found to have improved leveling characteristics.

The above Examples 9 and 10 are exemplary of relatively large amounts of resin and relatively small amounts of wax type formulas.

Example 11

A. 330 grams of the oxidized polyethylene of B of Example 1 above was melted at a temperature of 230° F. Then, 66 grams of oleic acid was added during which the temperature dropped to 218° F. After the acid and polyethylene had been stirred for a few minutes, 66 grams of morpholine was added and stirring was continued until the mixture was homogeneous. This mixture was then poured slowly into 2300 grams of soft water at slightly below the boiling point with stirring by means of high speed agitation. The emulsion was then brought up to a total weight of about 3,000 grams by the addition of cold soft water.

B. A shellac solution was prepared by prewetting 200 grams of bleached shellac by mixing it in 400 grams of cold soft water. Then 50 grams of 26° Bé. aqueous ammonia and 50 grams of oleic acid were added simultaneously. This mixture was stirred at a temperature of 120° F. for 40 minutes. At the end of this time, 25 grams of tributoxy ethyl phosphate were added and enough soft water added to make the total weight 870 grams.

C. Emulsified polyacrylate containing 36% solids, which is the polyacrylate companion dispersion to the polystyrene dispersion described in A of Example 1 above and produced by the same company.

D. To prepare the finished polish, 27 cc. of wax emulsion A, 34 cc. of shellac solution B, 90 cc. of acrylic polymer C, 69 cc. of a 0.4% aqueous solution of fluorocarbon compound No. 9 in the above list, and 55 cc. of soft water were mixed together.

*Example 12*

A. The wax emulsion was prepared as set out in A of Example 11.

B. A plasticized polystyrene emulsion was prepared by mixing together 45 grams of dibutyl phthalate and 36 grams of tributoxy ethyl phosphate and these were added to 1500 grams of the aqueous dispersion of polystyrene of A of Example 1 above. The mixture of the two plasticizers was added during violent stirring of the dispersion and this stirring was continued for about 40 minutes to ensure thorough mixing.

C. An aqueous dispersion containing 40% by weight of solids consisting essentially of a copolymer of 90% of methylmethacrylate and 10% silicone methacrylate.

D. A shellac dispersion was prepared according to the procedure set out under B in Example 9 above.

E. The polish was produced by mixing 25 cc. of wax emulsion A, 40 cc. of plasticized polystyrene B, 10 cc. of the acrylic polymer dispersion C, 37 cc. of shellac dispersion D, 7 cc. of a 4.4% aqueous solution of fluorocarbon compound No. 18 and 156 cc. of softened water.

*Example 13*

To prepare this self polishing polish, the following were mixed together: 25 cc. of wax emulsion A of Example 11, 30 cc. of the plasticized polystyrene of B of Example 12, 20 cc. of the polyacrylate dispersion of C of Example 12, 37 cc. of shellac dispersion B of Example 9, 14 cc. of a 4.4% aqueous solution of compound No. 18 of the above list and 169 cc. of soft water.

*Example 14*

To prepare the polish composition of this example, the following were mixed: 50 cc. of the polystyrene dispersion B of Example 12, 156 cc. of soft water, 7 cc. of a 0.4% aqueous solution of fluorocarbon compound No. 11 in the above list, 37 cc. of shellac dispersion B of Example 9 and 25 cc. of wax emulsion A of Example 11.

*Example 15*

A. A wax emulsion was prepared containing:

| | Grams |
|---|---|
| Carnauba | 100 |
| Microcrystalline wax | 100 |
| Oxidized microcrystalline wax | 25 |
| Soap flakes | 35 |
| Caustic soda | 0.75 |
| 10 mol borax | 10.75 |
| Soft water to | 1500 |

The preparation procedure was followed as set out in A of Example 7.

B. Polystyrene emulsion of about 36% solids content.

C. Shellac solution of B of Example 5.

D. The complete polish was prepared by mixing 92 cc. of wax emulsion A, 30 cc. of polystyrene emulsion B, 34 cc. of shellac solution C, 69 cc. of a 0.4% aqueous solution of fluorocarbon compound No. 18 and 50 cc. of soft water.

*Example 16*

A. A wax emulsion was prepared by the procedure set out in A of Example 7 of 160 grams of Montan wax, 80 grams of oxidized microcrystalline wax, 48 grams of oleic acid, 48 grams of morpholine, and soft water to make a total of 1300 grams.

B. An aqueous dispersion of polyvinyl acetate-acrylic copolymer containing 50–52% by weight solids.

C. The polish formulation of this example was prepared by mixing 110 cc. of wax emulsion A, 28 cc. of dispersion B, 69 cc. of a 0.4% aqueous solution of fluorocarbon compound No. 11, and 68 cc. of soft water.

*Example 17*

A polish similar to that of Example 16 was prepared by mixing 110 cc. of wax emulsion A of Example 16, 28 cc. of dispersion B of Example 16, 14 cc. of a 4.4% aqueous solution of fluorocarbon compound No. 18, and 123 cc. of soft water.

*Example 18*

In this example, the polish was prepared by mixing 137 cc. of shellac solution B of Example 3, 69 cc. of a 0.4% solution of fluorocarbon compound No. 1 and 69 cc. of soft water.

*Example 19*

A polish was prepared by mixing 137 cc. of shellac solution B of Example 3 and 137 cc. of a 0.4% aqueous solution of fluorocarbon compound No. 9.

*Example 20*

Example 19 was repeated except that here the fluorocarbon compound was No. 15 in the above list.

*Example 21*

A. Manila loba C solution containing about 14% by weight solids was prepared by mixing 120 grams of loba C, 40 grams of 26° Bé. aqueous ammonia and 952 grams soft water.

B. The completed polish was prepared by mixing 261 cc. of A and 14 cc. of a 4.4% aqueous solution of fluorocarbon compound No. 18.

*Example 22*

The polish formula of Example 21 was repeated, except that here the fluorocarbon compound was No. 9.

*Example 23*

The polish formula of Example 21 was repeated, except that here the fluorocarbon compound was No. 15.

*Example 24*

A polish was prepared by mixing 150 cc. of the wax emulsion C of Example 3 and 125 cc. of a 1.0% aqueous solution of fluorocarbon compound No. 19.

*Example 25*

A polish was prepared by mixing 150 cc. of wax emulsion C of Example 3, 63 cc. of 4.4% aqueous solution of fluorocarbon compound No. 11 and 62 cc. of soft water.

*Example 26*

A polish was prepared by mixing 150 cc. of wax emulsion A of Example 5, 28 cc. of a 1.0% aqueous solution of fluorocarbon compound No. 19, and 97 cc. of soft water.

*Example 27*

A polish was prepared by mixing 150 cc. of wax emulsion A of Example 5, 63 cc. of a 4.4% aqueous solution of fluorocarbon compound No. 18 of the above list, and 62 cc. of soft water.

*Example 28*

A polish formulation was prepared by mixing 150 cc. of wax emulsion A of Example 7, 75 cc. of a 0.4% aqueous solution of fluorocarbon compound No. 11 and 50 cc. of soft water.

*Example 29*

A polish was prepared by mixing 150 cc. of wax emulsion A of Example 7, 28 cc. of a 1% aqueous solution of fluorocarbon compound No. 19 of the above list, and 98 cc. of soft water.

In each of the examples given above, the presence of the fluorocarbon compound improved the leveling of these self-polishing aqueous based polishes. As can be seen, the exemplary formulas are representative of the several different types of self-polishing polish formulations. The fluorocarbon compound of this invention was found to improve the leveling in every one of the different types of self-polishing polishes wherein the film former is dispersed in the aqueous continuous phase.

The fluorocarbon componds that are operable in this invention are either cationic, anionic and or non-ionic in aqueous systems, although the cationic and anionic are preferred. The cationic fluorocarbons have the surprising effect of working satisfactorily in the recommended small amounts even in the usual anionic polish compositions.

The above examples illustrate substantially all the commonly recognized types of water based self-polishing polishes which dry to a bright protective finish without requiring buffing. These examples therefore illustrate the fact that the leveling agents of this invention essentially are not specific to any one type of formulation, but improve the leveling characteristics of all types of water based self-polishing polishes so as to give a more uniform protective coating of the polished surface.

As set out above, the basic polish formula of this invention includes at least about 50% aqueous vehicle and up to about 50% solids. In general, the solids content will be between 5% and 50% with the preferred limit being about 10–50%. The solids include non-volatile film formers which may be either natural or synthetic waxes, natural or synthetic polymers and natural and synthetic resins and mixtures thereof and also include emulsifying and dispersing agents for dispersing the solids in the aqueous vehicle or base which is the continuous phase of the polish composition. The emulsifying and dispersing agent is present to perform its well known function and as is customary in this art is present in an amount sufficient to form a stable dispersion of the film former in the aqueous vehicle or base so that the dispersion will break down upon evaporation of the aqueous vehicle to form a thin layer of the film former on the surface, thereby depositing the film former in a smooth bright layer on the surface primarily be reason of the inclusion in the composition of the above described perfluoroalkyl leveling compound.

Although the basic ingredients are the aqueous vehicle and non-volatile film former, the emulsifier and dispersing agent, and the fluorocarbon leveling agent, it is of course well known in this art that modifiers may also be included for each of these ingredients as is illustrated in the preceding examples.

As mentioned, the film formers include waxes, polymers, resins and mixtures thereof.

The waxes include animal, vegetable, mineral, and synthetic waxes and wax-like materials. These waxes are all well known in this art and include: beeswax, microcrystalline, oxidized microcrystalline, paraffin, montan, ozokerite, caranuba, candellila, ouricury, palm, whale, sugar cane, esparto, lanolin, polyethylene, and telomers of ethylene with saturated organic compounds containing only carbon, hydrogen and oxygen, e.g. an alcohol, aldehyde, ketone, acid, ester, orthoester, acid anhydride, ether or acetal as disclosed in U.S. Patent No. 2,395,292.

As examples of natural and synthetic resins and polymers, the following are typical:

Shellac
Manila loba
"Amberol 750"—condensation product of maleic or fumaric anhydride with rosin and mixed polyhydroxy alcohols
"No. 3551"—condensation product of maleic anhydride and pentaerythritol
"No. 2694–C"—condensation product of maleic and high molecular weight glycols
Resins listed in U.S. Patent No. 2,839,482
Polyvinyl acetate
Polyvinyl chloride-acetate
Polyvinyl chloride
Polyacrylates
Copolymers of vinylidene chloride and acrylonitrile
Terpene resins
Terpene phenolic resins
Copolymer of vinyl acetate and crotonic acid
Copolymers of butadiene and styrene
Polyvinylidene chloride
Polyacrylates
Polymers of alkyl acrylates, allyl acrylate, methallyl acrylate, allyl methacrylate, crotyl acrylate, crotyl methacrylate, allyl ethacrylate, allyl cinnamate, methallyl methacrylate, ethallyl acrylate, ethallyl methacrylate, allyl alphaphenylacrylate, allyl alphachloroacrylate, acrylic acid, methacrylic acid, diallyl phthalate, dimethallyl phthalate, diallyl maleate, diallyl succinate, diallyl oxalate, divinyl benzene, dimethallyl itaconate, diethallyl itaconate, diallyl malonate, diallyl allylmalonate, diallyl citrate, triallyl citrate, diallyl fumarate, diallyl acetone, divinyl ether, diallyl ether, dimethallyl ether, glycol diacrylate (ethylene diacrylate), glycol dimethacrylate, glyceryl diacrylate, glyceryl dimethacrylate, glycol diethacrylate, trivinyl benzene, and mixtures thereof Among the emulsifying and dispersing agents that are useful for dispersing the film formers in the aqueous vehicle, the following are well known and customarily used in this art:

Morpholine salts of fatty acids of 12–18 carbon atoms such as morpholine oleate and stearate,
Acetates of n-primary amines having 12–18 carbon atoms in amine chain such as n-dodecyl amine acetate, n-octadecyl amine acetate, n-octadecenyl amine acetate and n-octadecadienyl amine acetate,
Monoesters of polyethylene glycols and fatty acids of 12–18 carbon atoms such as hexaethylene glycol monooleate,
Alkylated aryl polyether alcohols,
Alkali metal soaps of fatty acids of 12–18 carbon atoms,
Soaps of alkalis such as alkanolamines, borax, morpholine, ammonia, alkali metals, and the like with acids such as oleic acid, red oil, mixed amino fatty acids, and the like,
Di-n-octyl sodium sulfosuccinate,
Oleic acid condensate of polyethylene oxide,
Sodium salt of a secondary alkyl sulfate,
Aryl alkyl polyether alcohols,
Aryl polyether alcohols As mentioned earlier, various modifying agents may be included in the polishing compositions of this invention. Thus one type of modifier includes plasticizers for the film formers. Customarily plasticizers in this art include:

Diethylene glycol diacetate
Diacetin
Tricresyl phosphate
Dibutyl phthalate
Butyl phthalyl butyl glycolate
Methyl phthalyl ethyl glycolate
Trimethylene glycol di-2-ethyl hexoate
Trimethylene glycol di-2-ethyl butyrate
Tributoxyethyl phosphate As shown in the examples given herein, combinations of each type of ingredient may be used if desired.

The polishing compositions of this invention have a number of advantages over previous well known self-polishing compositions. The polishing compositions are capable of forming a level polish film without requiring the use of additional ingredients to form the film such as acid, heat and the like. The polish is completely stable in bulk but as soon as it has been spread in a thin layer over the surface to be polished will form a continuous clear glossy film in thin layers and at room temperature. It appears that the emulsifier or dispersing agent that is used forms a link between the water of the base and the film former ingredients so that the polishing composition remains stable until the water substantially evaporates. Upon evaporation of the water and other volatile ingredients, the film former coalesces to form the continuous glossy film. The leveling agent contributes to this uniform film forming coalescing, but the exact mechanism of this action is not known.

The term "low molecular weight alkyl groups" is intended to include preferably those with 1 to 5 carbon atoms.

Having described my invention as related to the embodiments set out herein, it is my intention that the invention be not limited by any of the details of description, unless otherwise specified, but rather be construed broadly within its spirit and scope as set out in the accompanying claims.

I claim:

1. A polishing composition driable to a bright surface without requiring buffing, comprising: a continuous aqueous phase; a dispersed non-volatile, water insoluble solid film former capable of being deposited in a smooth bright protective film upon evaporation of the aqueous constituent of said aqueous phase; a small amount of a dispersing agent present in the aqueous phase in an amount sufficient to form a stable dispersion of the film former in the aqueous phase with this dispersion breaking down upon evaporation of the aqueous constituent of the phase to form a thin layer of the film former on a surface thereby depositing the film former in a smooth, bright, protective layer on said surface; and as a leveling agent about 0.0025–2% by weight of the composition of a fluoroalkyl compound having the formula $$(C_aX'_{2a+1})_fZ$$

wherein $a$ is a small number of 6–12, $X'$ is a member of the class consisting of hydrogen and fluorine atoms with the groups $C_aX'_{2a+1}$ having at least 55% by weight of fluorine atoms, $f$ is a small whole number of 1–8, and $Z$ is a radical such that the compound $(C_aX'_{2a+1})_fZ$ is more water soluble than the compound $(C_aX'_{2a+1})_fH$, said dispersing agent being an agent other than said fluoroalkyl compound and being capable of dispersing said solid film former in the absence of said fluoroalkyl compound.

2. A polishing composition driable to a bright surface without requiring buffing, comprising: a continuous aqueous phase; a dispersed non-volatile, water insoluble solid film former capable of being deposited in a smooth bright protective film upon evaporation of the aqueous constituent of said aqueous phase; a small amount of a dispersing agent present in the aqueous phase in an amount sufficient to form a stable dispersion of the film former in the aqueous phase with the dispersion breaking down upon evaporation of the aqueous constituent of the phase to form a thin layer of the film former on a surface thereby depositing the film former in a smooth, bright protective layer on said surface; and as a leveling agent about 0.0025–2% by weight of a fluoroalkyl compound having a structural formula of the class consisting of $$C_aF_{2a+1}CONH(CH_2)_bN(C_bH_{2b+1})_2C_cH_{2c+1}Y$$

$$H(CF_2)_aCONH(CH_2)_bN(C_bH_{2b+1})_2C_cH_{2c+1}Y$$

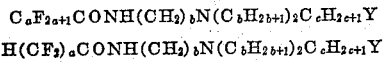

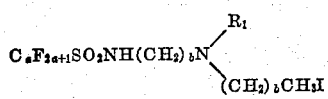

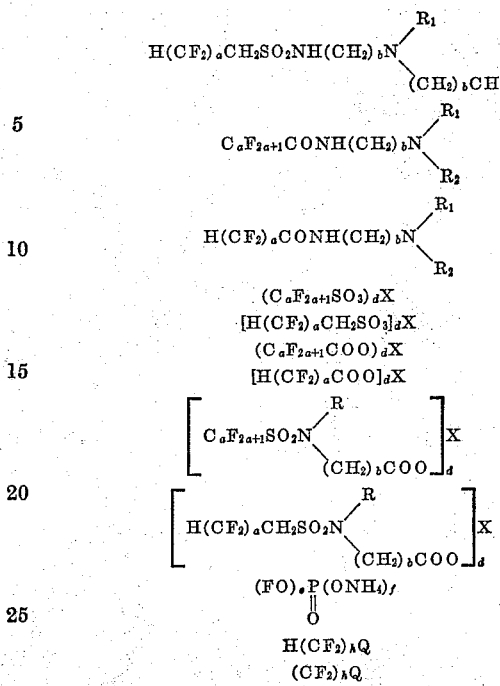

wherein $a$ is a whole number of 6–12, $b$ is a whole number not greater than 5, $c$ is a whole number not greater than 15, $d$ is a whole number not greater than 2 and having the same value as the valence of X, $e$ and $f$ are whole numbers totaling 3, X is a member of the class consisting of hydrogen, alkali metals, alkaline earth metals, amine groups, and ammonium, Y is a halogen, R is an alkyl group of not more than 5 carbon atoms, $R_1$ is a member of the class consisting of alkyl groups of not more than 5 carbon atoms and hydrogen, $R_2$ is a member of the class consisting of hydrogen, alkyl groups of not more than 5 carbon atoms, aryl groups, alkyl groups attached to a water-solubilizing salt-forming anion, heterocyclic aryl groups in which the nitrogen atom of said

portion of the second formula set out above is an element in the ring, $h$ is a whole number of 6–12, Q is a member of the class consisting of TOH in which T is a divalent hydrocarbon radical and TOH is a monovalent radical of a non-tertiary alcohol which contains a non-aromatic carbon atom bearing the alcoholic hydroxyl group and in which all of the non-aromatic carbon atoms are saturated, and at least partially water soluble oxidation products of TOH including aldehydes, acids and alkali metal, alkaline earth metal, amine and ammonium salts of said acids, and FO is a perfluorinated alcohol group containing 6 to 13 carbon atoms; and a Werner type coordination complex of trivalent chromium and perfluoroalkyl monocarboxylic acids containing from 7–13 carbon atoms per acid molecule in which the acids have the formula $C_gF_{2g+1}COOH$ wherein $g$ is a whole number of 6–12, and the ammoniated derivative of said complex, said dispersing agent being an agent other than said fluoroalkyl compound and being capable of dispersing said solid film former in the absence of said fluoroalkyl compound.

3. The polishing composition of claim 2 wherein said fluoroalkyl compound is a Werner type coordination complex of trivalent chromium and perfluoroalkyl monocarboxylic acids containing from 7–13 carbon atoms per acid molecule in which the acids have the formula $C_gF_{2g+1}COOH$ wherein $g$ is a small whole number of 6–12.

4. The polishing composition of claim 2 wherein said fluoroalkyl compound has the formula

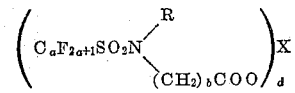

5. The polishing composition of claim 2 wherein said fluoroalkyl compound has the formula

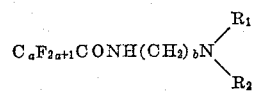

6. The polishing composition of claim 2 wherein said fluoroalkyl compound has the formula $$C_aF_{2a+1}CONH(CH_2)_bN(C_bH_{2b+1})_2C_cH_{2c+1}Y$$

7. The polishing composition of claim 2 wherein said fluoroalkyl compound has the formula $$(C_aF_{2a+1}SO_3)_dX$$

8. The polishing composition of claim 2 wherein said fluoroalkyl compound has the formula

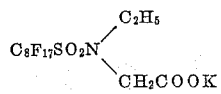

9. The polishing composition of claim 2 wherein said fluoroalkyl compound has the formula $$C_8F_{17}SO_3K$$

10. The polishing composition of claim 2 wherein said fluoroalkyl compound has the formula $$C_7F_{15}CONHC_3H_6N(CH_3)_3I$$

11. The polishing composition of claim 2 wherein said fluoroalkyl compound has the formula $$C_7F_{15}CONHC_3H_6N(CH_3)_2C_{10}H_{21}Br$$

12. The polishing composition of claim 4 wherein said fluoroalkyl compound has the formula $$C_7F_{15}CONHC_3H_6N(CH_3)_2C_2H_5I$$

References Cited in the file of this patent
UNITED STATES PATENTS

| | | |
|---|---|---|
| 2,290,583 | Dreger et al. | July 21, 1942 |
| 2,559,629 | Berry | July 10, 1951 |
| 2,559,750 | Berry | July 10, 1951 |
| 2,559,752 | Berry | July 10, 1951 |
| 2,567,011 | Diesslin et al. | Sept. 4, 1951 |
| 2,809,990 | Brown | Oct. 15, 1957 |
| 2,839,482 | Geen | June 17, 1958 |
| 2,856,420 | Crawford | Oct. 14, 1958 |